United States Patent [19]

Kotake et al.

[11] 4,329,637
[45] May 11, 1982

[54] CONTROL APPARATUS FOR A SYNCHRONOUS MACHINE

[75] Inventors: Tosio Kotake, Ichikawa; Katuaki Watanabe, Kawasaki; Kaoru Koyanagi, Yachiyo, all of Japan

[73] Assignees: Tokyo Denryoku Kabushiki Kaisha, Tokyo; Tokyo Shibaura Denki Kabushiki Kaisha, Kawasaki, both of Japan

[21] Appl. No.: 138,284

[22] Filed: Apr. 8, 1980

[30] Foreign Application Priority Data

Jun. 1, 1979 [JP] Japan .................................. 54-68466

[51] Int. Cl.³ .......................... H02H 7/06; H02P 9/00
[52] U.S. Cl. ...................................... 322/20; 322/22; 322/25; 322/28; 322/58; 361/20
[58] Field of Search .................. 322/20, 22, 25, 28, 322/32, 58; 361/20

[56] References Cited

U.S. PATENT DOCUMENTS

| | | | |
|---|---|---|---|
| 2,920,263 | 1/1960 | Curtis | 322/32 |
| 2,981,882 | 4/1961 | Rosenblatt | 322/24 |
| 3,477,014 | 11/1969 | Blythe | 322/19 |
| 3,656,048 | 4/1972 | Hauf | 322/25 |
| 3,671,850 | 6/1972 | Mehnart et al. | 322/28 |
| 3,999,115 | 12/1976 | South et al. | 322/25 |
| 4,080,559 | 3/1978 | Wright et al. | 322/58 |

FOREIGN PATENT DOCUMENTS 52-146818 12/1977 Japan .

OTHER PUBLICATIONS

Kotake et al., "An Analysis on the Suppression Effect of SSR by a Field Voltage Control", Paper 886 at National Meeting of DENKI GAKKAI, 4/4/79.
Itabashi et al., "Control of a Low Frequency Resonance Phenomenon in a Series Cap. Comp. Sys. by a Magnetic Excit. Ct.", Paper 1215, DENKI GAKKAI, 7/79.
El Serafi et al., "Control of Sub-Sync Res. Osc. by Multi-Loop Excitation Controller", Paper A79076-1 at IEEE PES., 2/4/79.

*Primary Examiner*—David Smith, Jr.
*Assistant Examiner*—J. W. Redman
*Attorney, Agent, or Firm*—Oblon, Fisher, Spivak, McClelland & Maier

[57] ABSTRACT

A shaft torsional oscillation signal of a rotatable torsional system including a rotor of a synchronous machine, at least one rotatable body and a shaft coupling the synchronous machine and the rotatable body, is detected. The shaft torsional oscillation signal with a specific frequency is made to advance the phase thereof by a stabilizing control device. The field voltage of the synchronous machine is so controlled that a sub-synchronous resonance (SSR) of the rotatable torsional system caused by the specific frequency is restrictedly controlled by the shaft torsional signal of the specific frequency phase-advanced.

10 Claims, 9 Drawing Figures

CONTROL APPARATUS FOR A SYNCHRONOUS MACHINE

BACKGROUND OF THE INVENTION

The present invention relates to a control apparatus for a synchronous machine.

In a power system, a power capacitor is frequently used for improving a steady state stability or a transient stability of the power system. For example, the power capacitor is inserted in series fashion in an ultrahigh voltage transmission line to reduce the reactance of the transmission line apparently, whereby the transmission capacity is increased. When the power capacitor is inserted in a power system coupled with a synchronous machine and the capacitance of the power capacitor is large, a transient oscillation component having a frequency $f_e$ given by the following equation occurs in the power system.

$$f_e = \sqrt{\frac{Xc}{Xe + Xd''}}$$

That is, the frequency $f_e$ is varied by $Xc$ = reactance of the power capacitor, $Xe$ = reactance of the power system, $Xd''$ = subtransient reactance of the synchronous machine, and other factors not shown. As a result, the transient oscillation component induces a pulsating current with a slip frequency $f_o \pm f_e$ with respect to the rated frequency $f_o$ of the synchronous machine into the field winding circuit of the rotor and damper winding circuit of the synchronous machine. Normally, such a transient current component is attenuated by the resistive components included in the power system, thus causing no trouble in the power system. In the recent ultrahigh voltage transmission line, however, the resistive components have small values. For this reason, if the power capacitor has a large capacitance, there occurs a case in which the transient oscillation component of frequency $f_e$ is not attenuated but instead diverges. Such instability phenomena of the power system are generally called a self excitation and are considered in one of two categories. The first category is called the induction generator effect and is an instable phenomenon caused with relation to only the power system and the electrical circuit of the synchronous machine. The other is called the sub-synchronous resonance phenomenon (SSR). The SSR is an instable phenomenon including a low frequency resonant oscillation between the power system and the rotatable torsional system including a rotor of a synchronous machine, a turbine and a shaft coupling the rotor and turbine. The SSR is also caused between the power system and the electrical circuit of the synchronous machine. More precisely, when disturbance occurs in the power system of the fundamental frequency $f_o$ and a transient oscillation current component of a frequency $f_e$, dependent on the capacitance of the power capacitor and the like, additionally flows into the armature circuit of the synchronous machine and a current with a slip frequency $f_s$ ($=f_o \pm f_e$) is induced in the rotor circuit of the synchronous machine. The current of $f_s$ acts on the air gap flux of the synchronous machine to produce an electrical torque pulsating with the slip frequency $f_s$ in the synchronous machine. When the pulsating frequency $f_s$ ($=f_o - f_e$) lower than the rated frequency of the synchronous machine approximates to one frequency $f_m$ of the inherent oscillatory frequencies depending on the torsion of the turbine shaft system and the damping effect to the torsion is insufficient, the electrical torque of the synchronous machine amplifies the torsional oscillation of the turbine shaft system. The torsional oscillation of the turbine shaft system induces a speed voltage of the frequency $f_e$ of the transient oscillation component in the armature circuit of the synchronous machine. If the growing of the torsional oscillation is left as it is, the positive feedback coupling between the electrical system of the synchronous machine and the turbine shaft causes divergent instable phenomenon. This instable phenomenon is the SSR.

The following countermeasures have been taken for decreasing the SSR: (1) minimizing the capacitance of the power capacitor causing the transient oscillation component of the frequency $f_e$; (2) inserting a resistor in series to the power transmission system for decreasing the transient oscillation component; (3) removing the transient oscillation component of $f_e$ by inserting a static filter in the power transmission system. Those countermeasures, however, have the following disadvantages. The (1) prevents the improvement of the transient stability in the power transmission system. The (2) increases the power transmission loss. The (3) increases the cost of the equipment. Accordingly, those approaches have insufficiently succeeded in attaining their ends.

SUMMARY OF THE INVENTION

Accordingly, an object of the invention is to provide a control apparatus for a synchronous machine for restricting the sub-synchronous resonance phenomenon by detecting a torsional oscillation signal of a torsional system, adjusting the phase of the torsional oscillation signal and controlling the field voltage of the synchronous machine by the torsional oscillation signal phase adjusted.

According to the invention, there is provided a control apparatus for a synchronous machine which comprises a first device for detecting torsional oscillation signals of a rotatable torsional system including a rotor of a synchronous machine coupled with a power system, at least one rotatable body and a rotatable shaft coupling the rotor and rotatable body; a second device for obtaining from the torsional oscillation signals a torsional oscillation signal having a frequency of a selected particular mode of inherent shaft torsional oscillatory frequencies; and a third device for restricting a sub-synchronous resonance in the rotatable torsional system, the third device including at least one stabilizing control device for adjusting the phase of the output signal from the second device and a field voltage control circuit for controlling the field voltage of the synchronous machine by the output signal from the stabilizing control device thereby to decreasing a sub-synchronous resonance (SSR) of the rotatable torsional system. The stabilizing control device advances the phase of the output signal from the second device so that the change in electrical torque in the synchronous machine has a component which coincides with the change in angular speed of the rotatable torsional system.

Other objects and features of the invention will be apparent from the following description taken in connection with the accompanying drawings, in which:

DETAILED DESCRIPTION OF THE PREFERRED EMBODIMENTS

Figure 1:
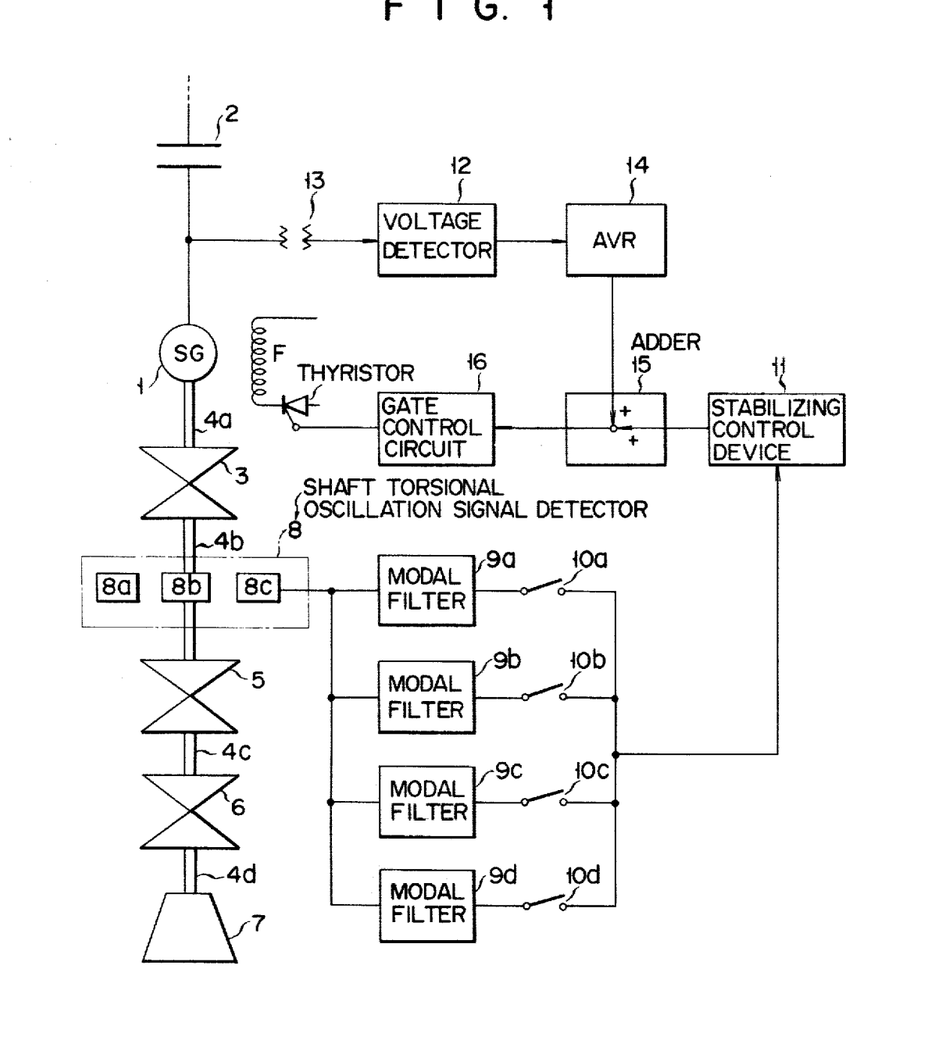
FIG. 1 shows a block diagram of a control apparatus for a synchronous machine which is an embodiment according to the invention.

Referring to FIG. 1, there is shown an embodiment of a control apparatus for a synchronous machine according to the invention. In the figure, a synchronous generator 1 has a field winding F of which the field current is controlled by a thyristor (SCR), and is connected at the output terminal to a power transmission line (not shown) through a capacitor 2 connected in series therebetween. A low pressure turbine 3 directly coupled with the synchronous generator 1 through a rotatable shaft 4a, is coupled with low pressure turbines 5 and 6, and a high pressure turbine 7, through rotatable shafts 4b to 4d, as shown. A shaft torsional oscillation signal detector 8 is comprised of an energy supply unit 8a, a shaft torsional oscillation detecting unit 8b and a receiver unit 8c. The shaft torsional oscillation detecting unit 8b is coupled with the shaft 4b for detecting a stress of the shaft 4b. The detecting unit 8b may be coupled with any one of the shafts 4a to 4d.

Figures 2, 3:
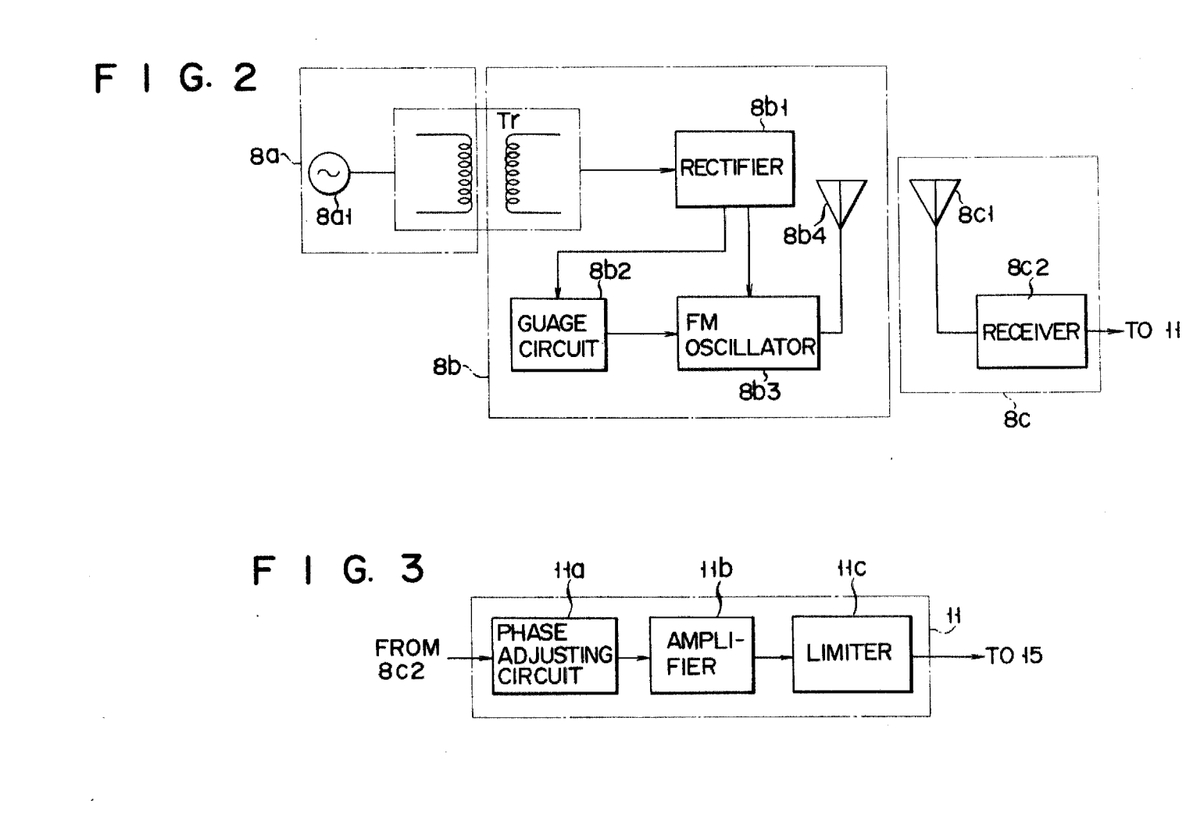
FIG. 2 is a block diagram of a device for detecting a torsional oscillation signals of a rotatable torsional system shown in FIG. 1.
FIG. 3 is a block diagram of a stabilizing control device used in the circuit in FIG. 1.

Turning now to FIG. 2, there is shown an example of the shaft torsional oscillation signal detector. As shown, the energy supply unit 8a includes an AC power source 8a1, and the primary coil of a rotatable transformer Tr. The shaft torsional oscillation detecting unit 8b includes the secondary coil of the rotatable transformer Tr, a rectifier 8b1, a gauge circuit 8b2, an FM oscillator 8b3 and a transmission antenna 8b4. The receiving unit 8c includes a receiving antenna 8c1 and a receiver 8c2. A voltage from the AC power source 8a1 is applied through the rotatable transformer Tr, and the rectifier 8b1 to the gauge circuit 8b2 where a shaft torsional oscillation signal is detected. The signal detected is carried by a carrier wave signal produced by the FM oscillator 8b3 and transmitted from the transmission antenna 8b4. The receiving antenna 8c1 receives the shaft torsional oscillation signal carried by the carrier wave and transfers it to a receiver 8c2. The receiver 8c2 applies the shaft torsional oscillation signal to modal filters 9a to 9d.

The frequency of an inherent shaft torsional oscillation depends on an inertia constant of each mass in a turbine generator shaft system having a rotor of the synchronous generator 1, and the rotatable shafts 4a to 4d of the low pressure turbine and the high pressure turbines 3, 5, 6 and 7, and a shaft stiffness constant of each turbine shaft. Each of the modal filters serves to extrude one of the inherent shaft torsional oscillation frequencies from the shaft torsional oscillation signal detector 8, as a tuning frequency. Incidentally, when the turbine generator shaft system has N masses, the inherent shaft torsional oscillation frequencies are (N−1). In the embodiment shown in FIG. 1, the number of masses is 5, so that there are four inherent shaft torsional oscillation frequencies are 4. It is for this reason that the embodiment under discussion is provided with four modal filters so as to pick up all the existing inherent shaft torsional oscillation frequencies in the torsional system. Switches 10a to 10d are provided in association with the respective modal filters. The switches serve to apply an output of a selected modal filter or the outputs of all the modal filters to the stabilizing control device 11. In order to detect the terminal voltage of the synchronous generator 1, a voltage detector 12 is provided through a voltage transformer 13. The output signal from the detector 12 is supplied to an automatic voltage regulator 14 (AVR). An adder circuit 15 sums up the output signal from the AVR 14 and the output signal from the stabilizing control circuit 11. The output signal from the adder circuit 15 is supplied to a gate control circuit 16. An SCR is connected in series with the field winding F of the synchronous generator 1, and the field voltage of the field winding is controlled by controlling the gate of the SCR by the output of the gate control circuit 16.

The construction of the stabilizing control device 11 is illustrated in FIG. 3, in block form. In the figure, a phase adjusting circuit 11a receives the output signal from the modal filters 9a to 9d to adjust the phase of the output signal. The output signal of the phase adjusted is amplified by an amplifier circuit 11b and the output signal from the amplifier is limited to a proper amplitude and, the signal having the limited amplitude is applied as an addition factor to the adder 15. The phase adjusting circuit 11a is so designed to have a transfer function, as example, shown by the equation (1)

$$\left(\frac{1 + T_2 S}{1 + T_1 S}\right) \quad (1)$$

where $T_1$ and $T_2$ are time constants of the transfer function shown by the equation (1), and S is Laplace operator. The circuit with the transfer function of the equation (1) is known as a phase lead-lag circuit. When $T_2 > T_1$, the phase adjusting circuit 11a serves to advance the phase of the input signal on the basis of the transfer function shown by the equation (1). As a result of the phase adjustment, the gain of the phase adjusting circuit 11a varies. The gain variation is compensated by a gain K in the amplifier 11b and finally the signal from a modal filter is compensated by the transfer function $$K\left(\frac{1 + T_2S}{1 + T_1S}\right)$$

in the stabilizing control device 11 and is outputted therefrom as a control signal. A limiter 11c is used optionally or if necessary, and is not essential to the stabilizing control circuit.

The operation of the embodiment thus far described will be described hereinafter. When the power system is in a steady state, no pulsating torque occurs in the rotor circuit of the synchronous generator 1. Accordingly, none of the modal filters 9a to 9d produces output signals to the stabilizing control device 11. In other words, the stabilizing control device 11 applies no control signal to the gate control circuit 16. Accordingly, the synchronous generator is operated by the field voltage under control of the AVR 14. In such a normal operation of the synchronous generator, it is assumed that a disturbance occurs in the power system with a fundamental frequency $f_o$ and that a transient oscillation current component with a frequency $f_e$ dependent on the capacitance of the series capacitor 2 additionally flows into the armature circuit of the synchronous generator 1. At this time, a current with a slip frequency $f_s = f_o - f_e$ (one of slip frequencies) is induced in the rotor circuit. As a result, an electrical torque pulsating with the frequency $f_s$ is produced in the synchronous generator 1. The pulsating frequency $f_s$ resonates with one of the inherent shaft torsional frequencies $f_1$, $f_2$, $f_3$ and $f_4$, so that a great shaft torsional oscillation occurs in the turbine shaft. A torsional oscillation signal having frequencies $f_1$ to $f_4$ is applied to the modal filters 9a to 9d. If only the inherent oscillation frequency $f_2$ is considered, it is assumed that only the shaft torsional oscillation signal with only the frequency $f_2$ of those with the frequencies $f_1$ to $f_4$ is produced from the modal filter 9b. Assume now that the switches 10a to 10d are in close condition. In this case, the output signals from the modal filters are inputted to the stabilizing control device 11. In the now proceeding discussion, since the frequency $f_2$ is considered under discussion, the output signal from the modal filter 9b tuning with the inherent oscillation frequency $f_2$ is larger than those of the remaining modal filters 9a, 9c and 9d. Accordingly, the signal of $f_2$ dominantly occupies the signal applied to the stabilizing control device 11. Assume again that the transfer function of the phase adjusting circuit 11a of the stabilizing control device 11 is $$\left(\frac{1 + T_2S}{1 + T_1S}\right) = \left(\frac{1 + 0.045S}{1 + 0.009S}\right),$$

and the gain K of the amplifier circuit 11b is 30(=K). On this assumption, the compensated transfer function of the stabilizing control device 11 becomes $$K\left(\frac{1 + T_2S}{1 + T_1S}\right) = 30\left(\frac{1 + 0.045S}{1 + 0.009S}\right)$$

The shaft torsional oscillation signal of the inherent oscillation frequency $f_2$ supplied to the stabilizing control device 11 is made to advance its phase at the frequency $f_2$ on the basis of the transfer function, and is applied to the adder circuit 15. In the adder circuit 15, the output signal from the stabilizing control device 11 and the output signal from the AVR 14 are composed and the composed signal drives the gate control circuit 16. As a result, the output signal from the circuit 16 is applied to the gate of the thyristor, thereby to control the field voltage. Accordingly, the electrical torque of the synchronous generator 1 is varied by the output signal from the stabilizing control device 11. A deviation $\Delta Te$ of the electrical torque of the synchronous machine 1 from that in a steady state varies with the same oscillation frequency $f_2$ as that of the component of frequency $f_2$ taken out of the modal filter 9b. Therefore, by adjusting the phase and the amplification value of the input oscillation signal by the stabilizing control device 11, it is possible to control a phase between the deviation $\Delta Te$ of the electrical torque of a specific oscillation frequency component and a deviation $\Delta \omega$ of an angular velocity of the turbine generator shaft system from that in a steady state. The damping coefficient D of the shaft torsional oscillation relating to a specific oscillation frequency is given $$D = \frac{\Delta Te}{\Delta \omega} \cos\theta \tag{2}$$

where $\theta$ is a phase difference between the deviations $\Delta Te$ and $\Delta \omega$. Accordingly, a damping coefficient $D_2$ of the shaft torsional oscillation at $f_2$ is given $$D_2 = \frac{\Delta Te_2}{\Delta \omega_2} \cos\theta \tag{3}$$

where $\Delta Te_2$ is a deviation of the electrical torque of the synchronous generator 1 at the oscillation frequency component $f_2$ derived from the modal filter 9b, $\Delta \omega_2$ is a deviation of the angular velocity of the turbine shaft system from that in a steady state, and $\theta$ is a phase difference between $\Delta Te_2$ and $\Delta \omega_2$.

Figure 4:
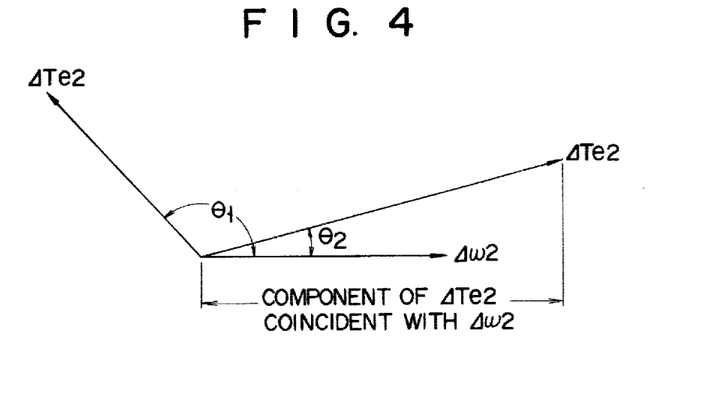
FIG. 4 is a vector diagram illustrating a phase relation between a deviation of a rotating speed of a turbine shaft system of FIG. 1 from that in a steady state and a deviation of an electrical torque of the synchronous machine from that in a steady state.

FIG. 4 illustrates a phase relation between $\Delta Te_2$ and $\Delta \omega_2$ in a vector diagram. In the figure, $\theta_1$ is a phase difference between $\Delta Te_2$ and $\Delta \omega_2$ produced when the present invention is not applied, that is to say, the field voltage is not controlled through the phase adjustment and amplified value of the oscillation frequency $f_2$. $\theta_2$ is a phase difference between them produced when the field voltage is controlled through the adjustments of them. As shown in the figure, $\theta_1$ is within 90° and 270° (90° < $\theta_1$ < 270°) and accordingly, the damping coefficient $D_2$ is given by the following equation (4)

$$D_2 = \frac{\Delta Te_2}{\Delta \omega_2} \cos\theta_1 < 0 \tag{4}$$

In this case, the damping coefficient is negative and accordingly the oscillation of the torsional system is amplified. When the $\theta_2$ is smaller than 90°, the damping coefficient $D_2$ is given by the following equation (5)

$$D_2 = \frac{\Delta Te_2}{\Delta \omega_2} \cos\theta_2 \ 0 \tag{5}$$

In this case, the damping coefficient is positive, so that the oscillation of the torsional system on the basis of the component of the oscillation frequency $f_2$ is restricted.

In other words, the above mentioned SSR (sub-synchronous resonance) is restricted to stabilize the power system. When some cause changes a capacitance of the series capacitor 2, the inherent oscillation frequency of the turbine generator shaft torsional system changes to $f_3$ which resonates with the transient oscillation frequency component generated in the electrical circuit. At this time, the modal filter 9c tuning with the frequency $f_3$ allows only the component of the $f_3$ to pass therethrough. The shaft torsional oscillation signal of $f_3$ is applied to the stabilizing control device 11, where its phase is advanced, as described above. By the control signal phase-adjusted, the field voltage is controlled through exactly the same process as the above-described one. As a result, the SSR at $f_3$ is controlled to stabilize the power system. When the capacitance of the series capacitor 2 changes, the change of the capacitance changes the inherent oscillation frequency to $f_1$ or $f_4$, the SSR corresponding to $f_1$ or $f_4$ is also controlled restrictedly through the process similar to the above-mentioned one, so that the power system is stabilized.

Figure 5:
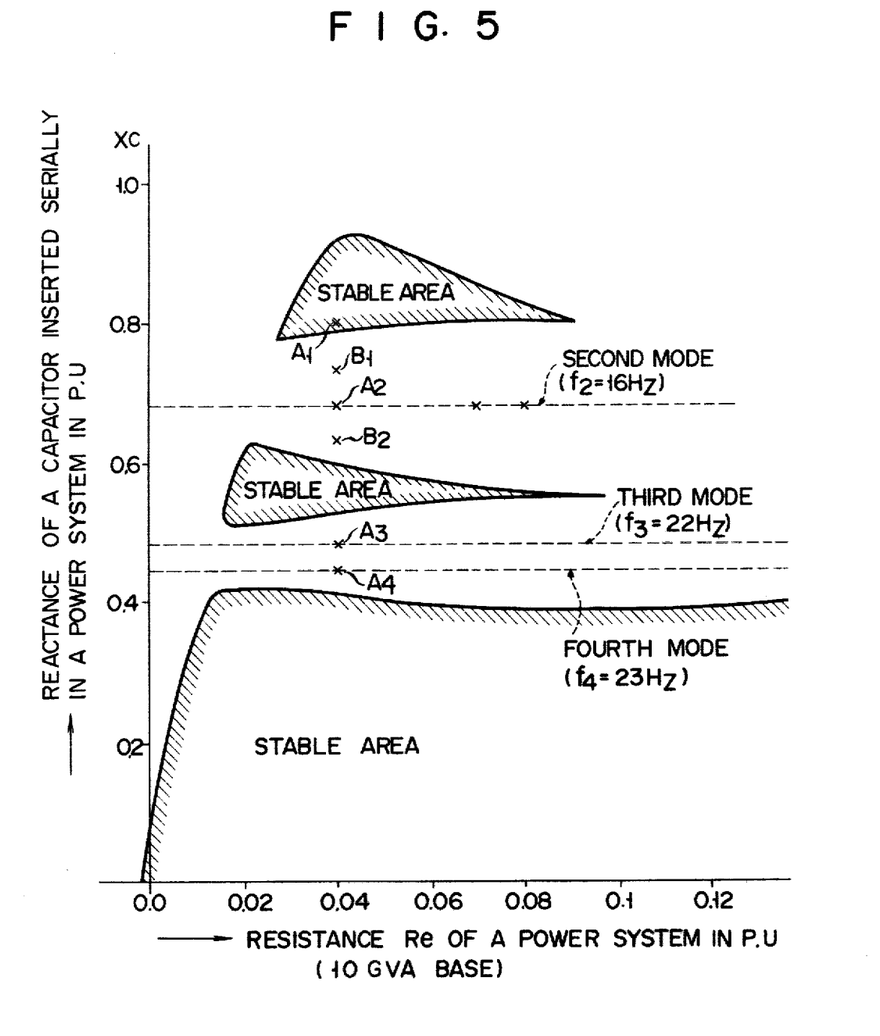
FIG. 5 is a graph illustrating an example of a stability valuation computation of a power system to which the invention is not applied.
Figure 6:
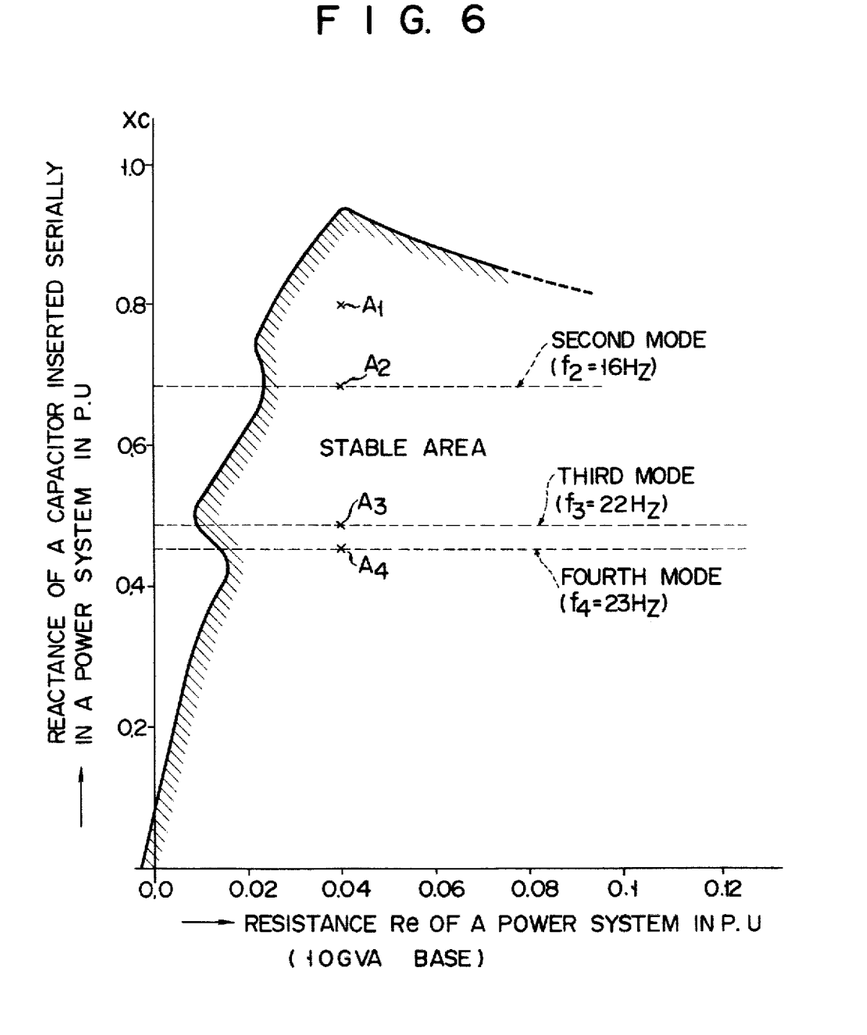
FIG. 6 is a graph illustrating an example of the stability valuation computation of the same power system as that in FIG. 5 to which the invention is applied.

Explanation to follow is for a stability analysis by eigenvalue method using a digital computer, for more clear understanding of the effect of the invention. FIG. 5 shows a stability valuation curve of power system obtained when the present invention is not applied to a one-machine-to-infinite-bus system model. In FIG. 5, the abscissa represents the entire resistance Re of a power system line of 10 GVA base in a power system in P.U. (per unit). The ordinate in FIG. 5 represents the reactance of the series capacitor 2 in P.U. Assume that the respective inherent oscillation frequencies of the turbine shaft torsional system are: $f_1 = 9$ Hz, $f_2 = 16$ Hz, $f_3 = 22$ Hz, and $f_4 = 23$ Hz, and those are called first, second, third and fourth modes in the order from low to high frequencies. In FIG. 5, instable areas caused by the SSR exist in the vicinity of Xc (reactance of the series capacitor 2 resonating with the second to fourth modes)=0.69, 0.49 and 0.45 P.U. The instable areas divide a stable area into three areas. The first mode is not illustrated. The stability valuation curve shown in FIG. 6 is depicted when the present invention is applied to the model of FIG. 5. As described above, the present invention restricts the SSR at the respective inherent oscillation frequencies $f_1$, $f_2$, $f_3$ and $f_4$ of the rotatable torsional system, so that the power system is stabilized. Accordingly, the instable areas caused by the SSR corresponding to the second, third and fourth modes are reduced while the stable area is enlarged by the amount of the reduction of the instable areas, as shown in FIG. 6. For example, when the synchronous generator 1 is operating at a point $A_1$ shown in FIG. 5, if some cause changes the capacitance of the series capacitor 2 and the operating point is shifted to any one of the points $A_2$, $A_3$ and $A_4$, those points $A_2$ to $A_4$ are included in the stable area, as shown in FIG. 6, when the present invention is applied. Accordingly, the power system is stabilized.

Figure 7:
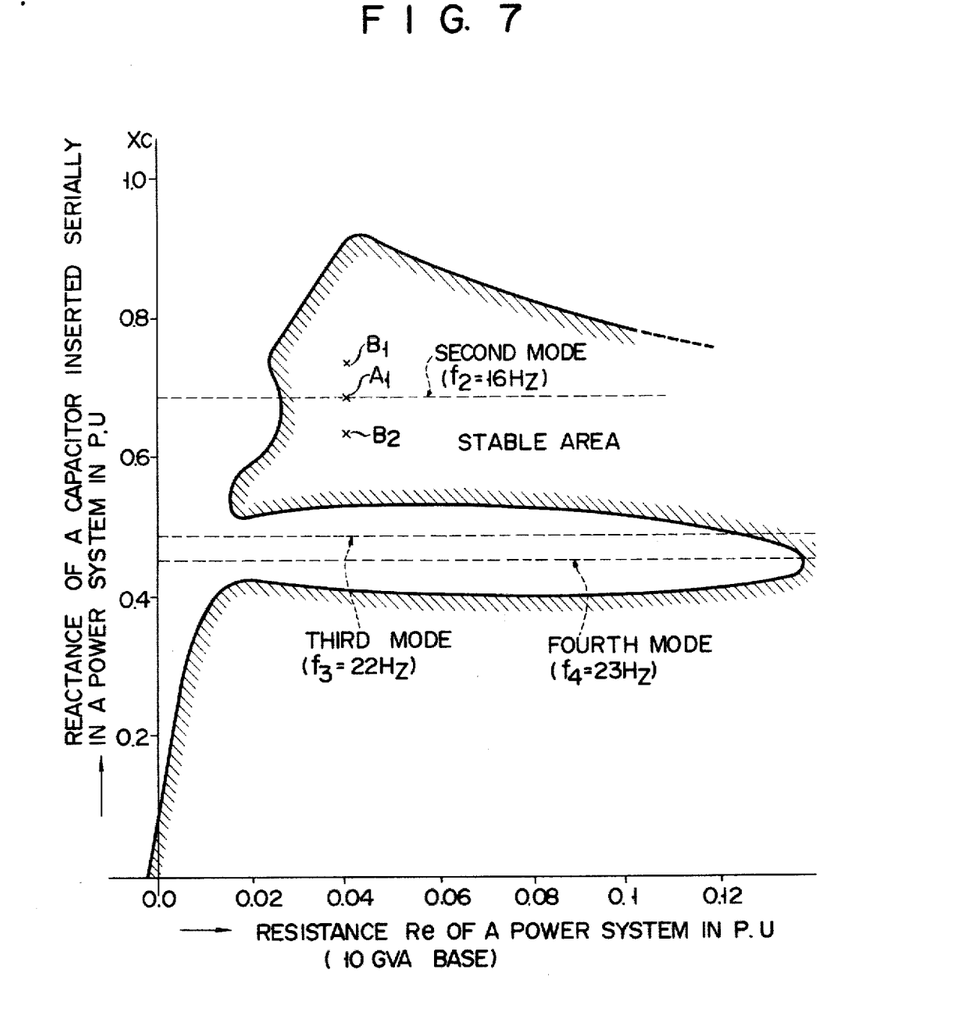
FIG. 7 is a graph illustrating an example of the stability valuation computation in the case where only the oscillation frequency in a specific mode in a torsional system is applied to the invention in the same power system shown in FIG. 5.

In the embodiment shown in FIG. 1, the switches 10a to 10d are all in closed state. In fact, what switch may be closed depends on the operating condition of the power system. However, for example, when the operating position of the synchronous generator 1 varies only in the vicinity of the second mode (FIG. 5), only the switch 10b may be closed to restrict the SSR at the inherent oscillation frequency of the second mode. The stability valuation curve depicted when only the switch 10b is closed is illustrated in FIG. 7. When the operating point of the synchronous generator 1 is located at a point $A_1$ shown in FIG. 5 and the operating point shifts to point $B_1$ or $B_2$, by closing the switch 10b, the stable area corresponding to the second mode is enlarged as shown in FIG. 7 and the operating point $B_1$ or $B_2$ is included in the stable area, thus ensuring the stability of the power system. When the operating position of the synchronous generator 1 changes only in the vicinity of the third or fourth mode, by closing the switch 10c or 10d, the third or fourth mode SSR is restricted by the same reason as that mentioned above, so that the power system is stabilized.

Figure 8:
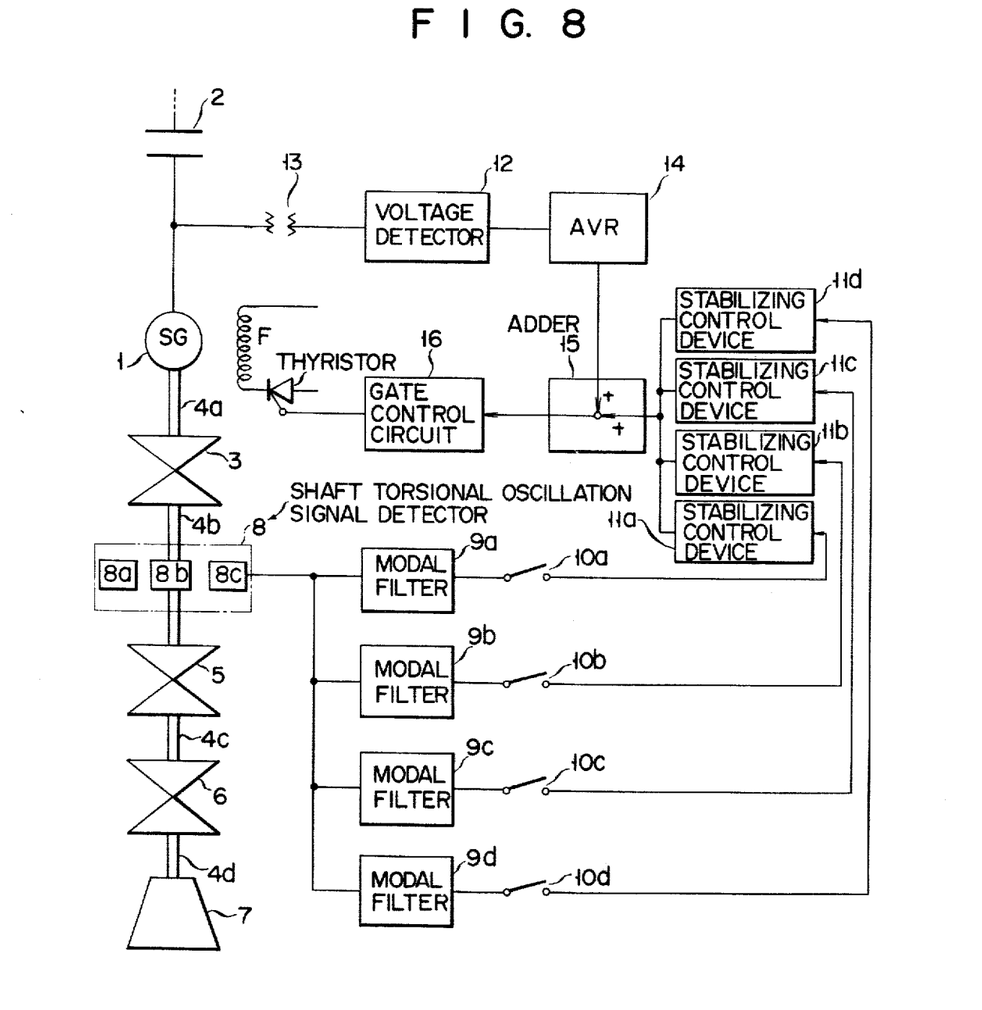
FIG. 8 is a block diagram of another embodiment of the control apparatus for a synchronous machine according to the invention.

Turning now to FIG. 8, there is shown another embodiment of a control apparatus for a synchronous machine according to the invention. In this embodiment, the stabilizing control devices 11a to 11d are provided corresponding to the modal filters 9a to 9d, respectively. If the circuit is so designed, the stabilizing control devices may have the transfer functions most suitable for the respective modes. Accordingly, it is possible to easily adjust the phase of the signal of each mode. The remaining construction and operation of this embodiment are the same as those shown in FIG. 1, and thus no further elaboration of the embodiment will be described.

As described above, when the SSR phenomenon is caused by a capacitance change of the series capacitor due to disturbance occurring in the power system, a specific inherent torsional oscillation component is damped or impeded to enlarge the stable area of the power system and to swiftly restrict the SSR. In this way, the power system may be stabilized. Therefore, there is no need for restricting the capacitance of the series capacitor, inserting a resistor in the power transmission line or inserting a static filter into the power system for restricting the SSR. Accordingly, the control apparatus for a synchronous machine according to the invention is free from reduction of a transient stability, increase of the power transmission loss, and expensiveness of the equipment.

The present invention is not limited to the above-mentioned embodiment but may be embodied as in the following way, for example.

(1) The shaft torsional oscillation signal detector 8, which is mounted to the turbine shaft 4b in the above-mentioned embodiment, may be mounted to any turbine shaft if a specific shaft torsional oscillation signal to be controlled may be easily detected compared with other turbine shafts.

Figure 9:
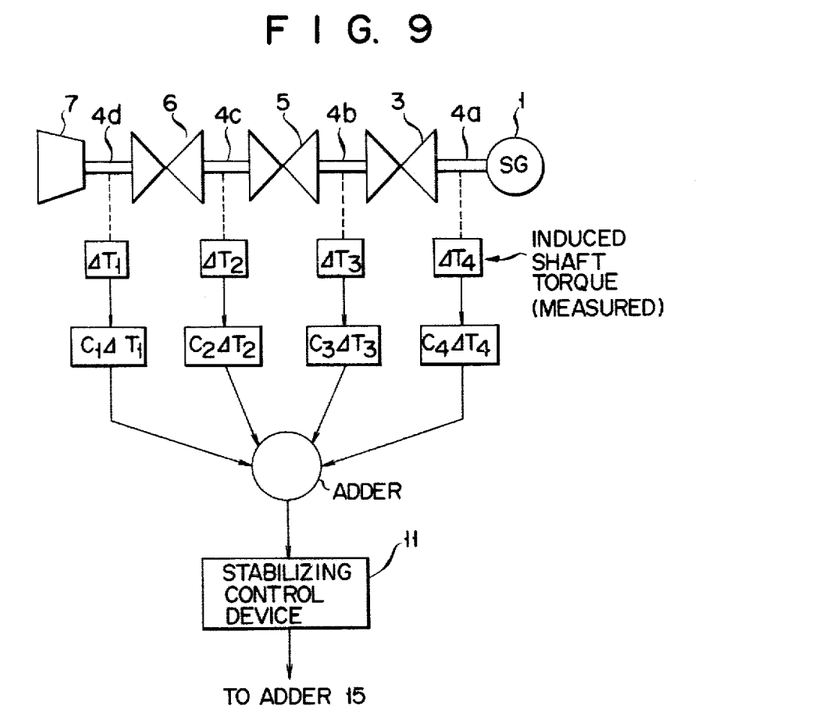
FIG. 9 is a block diagram of another example of the circuit for taking out the shaft torsional oscillation signal with a specific frequency from the rotatable torsional system shown in FIG. 1.

(2) In place of the modal filters, the shaft torsions at specific oscillation frequencies are measured on all the turbine shafts, the measured values are multiplied by the coefficients obtained by using the inertia constants at the measured masses and the stiffness constants of the turbine shafts, and the values as the results of the multiplications are arithmetically summed. The result of the summation is applied to the stabilizing control device by assuming that the result of the summation represents a torsional oscillation signal including a desired frequency component. In FIG. 9, induced shaft torques $\Delta T_1$, $\Delta T_2$, $\Delta T_3$ and $\Delta T_4$ at the oscillation frequency $f_2$ are measured, for example. Those measured values are multiplied by the constants $C_1$ to $C_4$ to obtain $C_1\Delta T_1$, $C_2\Delta T_2$, $C_3\Delta T_3$ and $C_4\Delta T_4$, respectively. The constants $C_1$ to $C_4$ are calculated by using the inertia constants at the masses corresponding to the measured values and the stiffness constants of the corresponding turbine shafts. Those products are summed, $T=C_1\Delta T_1+C_2\Delta T_2+C_3\Delta T_3+C_4\Delta T_4$. The sum $\Delta T$ is applied as the oscillation frequency $f_2$ signal to the stabilizing control device 11.

(3) The invention is applicable for a shaft torsional system of a synchronous motor directly coupled with a load as well as the shaft torsional system of a turbine generator.

(4) The present invention is applicable for a shaft torsional system of a turbine generator connected with a general power system not including a series capacitor therein. In this case, the control apparatus of the invention may impede or damp a shaft torsional oscillation of a turbine generator shaft system caused by relatively large disturbance such as line to ground faults or line to line faults.

(5) The phase adjusting circuit may have a plurality of transfer functions such as $$\left(\frac{1+T_2S}{1+T_1S}\right)\cdot\left(\frac{1+T_4S}{1+T_3S}\right).$$

What we claim is:

1. A control apparatus for a synchronous machine comprising:
    first means for detecting torsional oscillations signals of a rotatable torsional system including a rotor of a synchronous machine coupled with a power system, at least one rotatable body and a rotatable shaft coupling said rotor and said rotatable body, said first means including a statically provided AC power source, a rotatable transformer connected to said AC power source and coupled with said rotational torsional system, a rotatable rectifier for rectifying the output of said rotatable transformer, a rotatable gauge circuit supplied with a DC power from said rotatable rectifier and detecting a torsional quantity of said rotatable shaft for producing a control signal, an FM oscillator coupled with said rotatable rectifier and controlled by said control signal to produce torsional oscillation signals corresponding to said torsional quantity, and a transmitting antenna for transmitting said torsional oscillation signals;
    second means for receiving said torsional oscillation signals and producing a torsional oscillation signal having a frequency of a selected particular mode of inherent shaft torsional oscillatory frequencies; and
    third means for restricting a sub-synchronous resonance in said rotatable torsional system, said third means including at least one stabilizing control device for adjusting the phase of the output signal from said second means and a field voltage control circuit for controlling the field voltage of said synchronous machine by the output signal from said stabilizing control device.

2. A control apparatus for a synchronous machine according to claim 1, wherein said stabilizing control device advances the phase of said torsional oscillation signal having said selected particular mode so that a deviation of an electrical torque of said synchronous machine from that in a steady state has a component which is coincidence with a deviation of the angular velocity of said rotatable torsional system from that in a steady state.

3. A control apparatus for a synchronous machine according to claim 1, wherein said second means includes at least a single modal filter which is coupled with said first means and separates only the output signal with a desired inherent oscillation frequency from the output signal of said first means, and supplies the separated output signal into said third means.

4. A control apparatus for a synchronous machine according to claim 1, in which said stabilizing control device includes a phase adjusting circuit supplied with the output signal from said second means, and an amplifying circuit for correcting a gain of the output signal from said phase adjusting circuit, said phase adjusting circuit including a transfer function predetermined in accordance with the frequency of an input signal and advancing the phase of said input signal on the basis of said transfer function.

5. A control apparatus for a synchronous machine according to claim 4, wherein said stabilizing control device further includes a limiting circuit for limiting the amplitude of the output signal from said amplifying circuit to a given value.

6. A control apparatus for a synchronous machine according to claim 1, in which said field voltage control circuit includes a gate control circuit supplied with the output signal from said stabilizing device, and a thyristor (SCR) connected to a field winding of said synchronous machine and controlled by the output signal from said gate control circuit.

7. A control apparatus for a synchronous machine according to claim 1, wherein said field voltage control circuit includes an adder circuit for adding the output signal from an automatic voltage regulator for automatically controlling the voltage of the power system connected with said synchronous machine and the output signal from said stabilizing control device, a gate control circuit supplied with the output from said adder circuit, and a thyristor connected with a field winding of said synchronous machine for being controlled by the output from said gate control circuit.

8. A control apparatus for a synchronous machine according to claim 1, wherein said synchronous machine is a synchronous generator connected to a power transmission line and said rotatable body is a turbine directly coupled with said synchronous generator.

9. A control apparatus for a synchronous machine according to claim 1, wherein said second means includes a plurality of selection circuits for picking up different inherent torsional oscillation frequency components, the output signals of which are supplied to said third means through corresponding selection switches.

10. A control apparatus for a synchronous machine coupled in tandem to a plurality of rotatable bodies through a plurality of rotatable shafts, comprising:
    a plurality of first means for detecting torsional oscillation signals of said rotatable shafts, each first means including a statically provided AC power source, a rotatable transformer connected to said AC power source and coupled with a rotatable shaft, a rotatable rectifier for rectifying the output of said rotatable transformer, a rotatable gauge circuit supplied with the DC power from said rotatable rectifier and detecting a torsional quantity of the rotatable shaft for producing a control signal, an FM oscillator coupled with said rotatable rectifier and controlled by said control signal to produce torsional oscillation signals corresponding to said torsional quantity, and a transmitting antenna for transmitting said torsional oscillation signals;

a plurality of second means each for receiving said torsional oscillation signals from said transmitting antenna and producing an induced shaft torque;

a plurality of third means each for obtaining a modified induced shaft torque by multiplying said induced shaft torque by a coefficient determined by an oscillation frequency of a specific mode;

an adder for summing up said modified induced shaft torque; and fourth means for restricting a sub-synchronous resonance in a rotatable torsional system including said synchronous machine and said rotatable bodies, said fourth means including at least one stabilizing control device for adjusting the phase of the output signal from said adder and a field voltage control circuit for controlling the field voltage of said synchronous machine by the output signal from said stabilizing control device.

* * * * *